US012665537B2

(12) United States Patent
Norman

(10) Patent No.: US 12,665,537 B2
(45) Date of Patent: Jun. 23, 2026

(54) CLAMP FOR SECURING A SOLAR PANEL MODULE

(71) Applicant: Unirac Inc., Albuquerque, NM (US)

(72) Inventor: Gary Norman, Louisville, CO (US)

(73) Assignee: Unirac, Inc., Albuquerque, NM (US)

( * ) Notice: Subject to any disclaimer, the term of this patent is extended or adjusted under 35 U.S.C. 154(b) by 0 days.

(21) Appl. No.: 18/731,886

(22) Filed: Jun. 3, 2024

(65) Prior Publication Data

US 2025/0373191 A1 Dec. 4, 2025

(51) Int. Cl.
*H02S 20/22* (2014.01)
*F16B 2/06* (2006.01)
*F24S 25/60* (2018.01)

(52) U.S. Cl.
CPC .............. *H02S 20/22* (2014.12); *F16B 2/065* (2013.01); *F24S 25/60* (2018.05); *F24S 2025/6003* (2018.05)

(58) Field of Classification Search
CPC .................................................. H02S 20/00–32
USPC .................................................. 136/243–265
See application file for complete search history.

(56) References Cited

U.S. PATENT DOCUMENTS 10,622,935 B1 4/2020 Liu
2012/0175322 A1 7/2012 Park et al.

2012/0312356 A1* 12/2012 Mizuo ..................... H02S 20/23
136/251
2015/0101655 A1* 4/2015 Schuit ..................... F16B 2/065
136/251
2016/0111996 A1* 4/2016 Stephan .................. H02S 20/23
248/316.6
2019/0049151 A1 2/2019 Harris et al.
2022/0200521 A1 6/2022 Kauffman et al.

OTHER PUBLICATIONS

Invitation to Pay Additional Fees for International Application No. PCT/US2025/030787, Dated Jul. 17, 2025, 2 pages.
Search Report and Written Opinion for International Application No. PCT/US2025/030787, Dated Sep. 10, 2025, 12 pages.

* cited by examiner

*Primary Examiner* — Bach T Dinh

(74) *Attorney, Agent, or Firm* — Lee & Hayes, P.C.

(57) ABSTRACT

A clamp includes a mount, a connector, and a fastener. The mount has a slot and a channel. The connector attaches to the mount and is transitionable between a first position and a second position in which a solar panel module is securable to the mount. The connector has a post at least partially disposed in the channel and which traverses within the channel between the first position and the second position of the connector. The fastener is disposed at least partially in the slot for attaching the connector to the mount. The fastener tightens to secure the solar panel module to the mount.

9 Claims, 20 Drawing Sheets

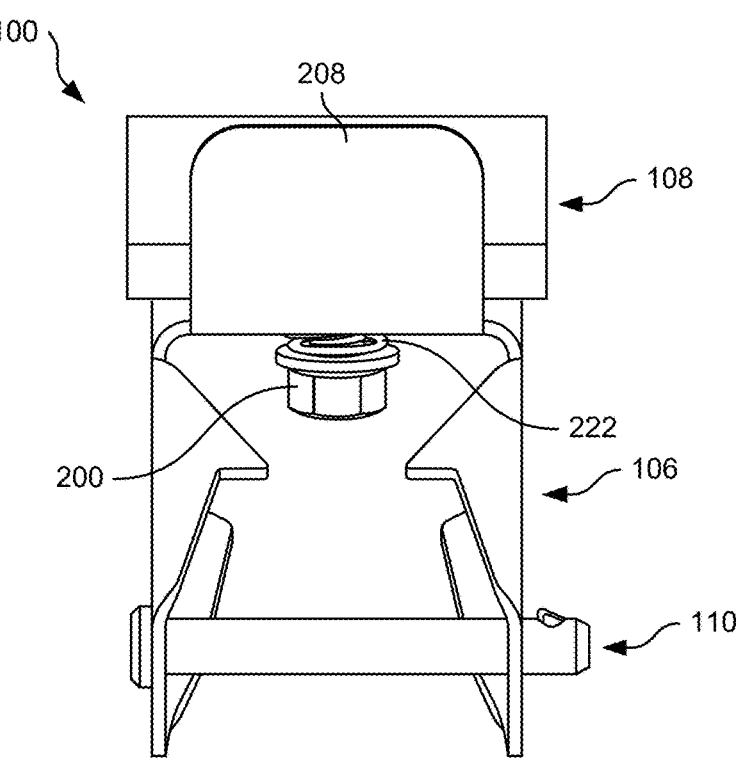
FIG. 2A
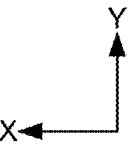
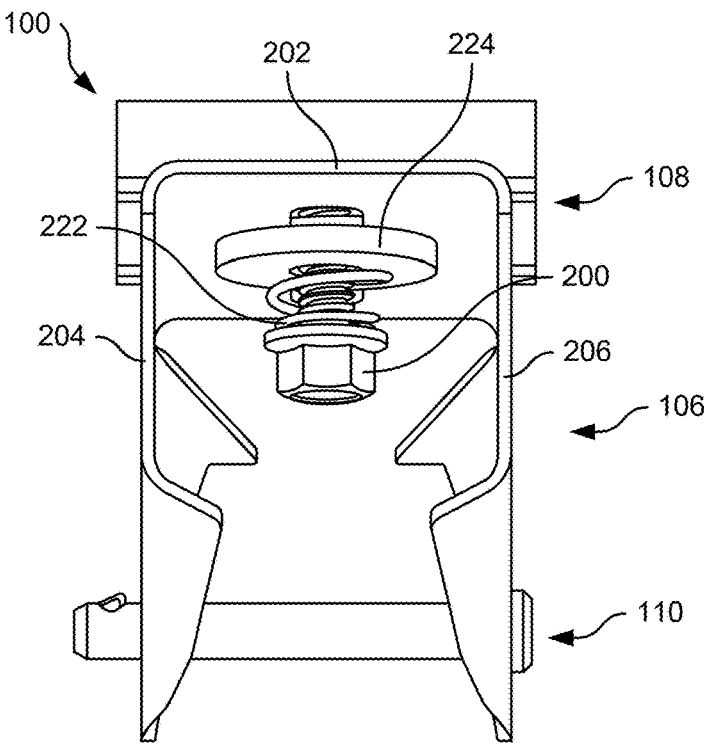
FIG. 2B
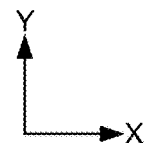

100

110

208

202

108

100

200

216

204

212

218

206

214

220

108

210

202

SECOND DIRECTION 504

THIRD
DIRECTION
506

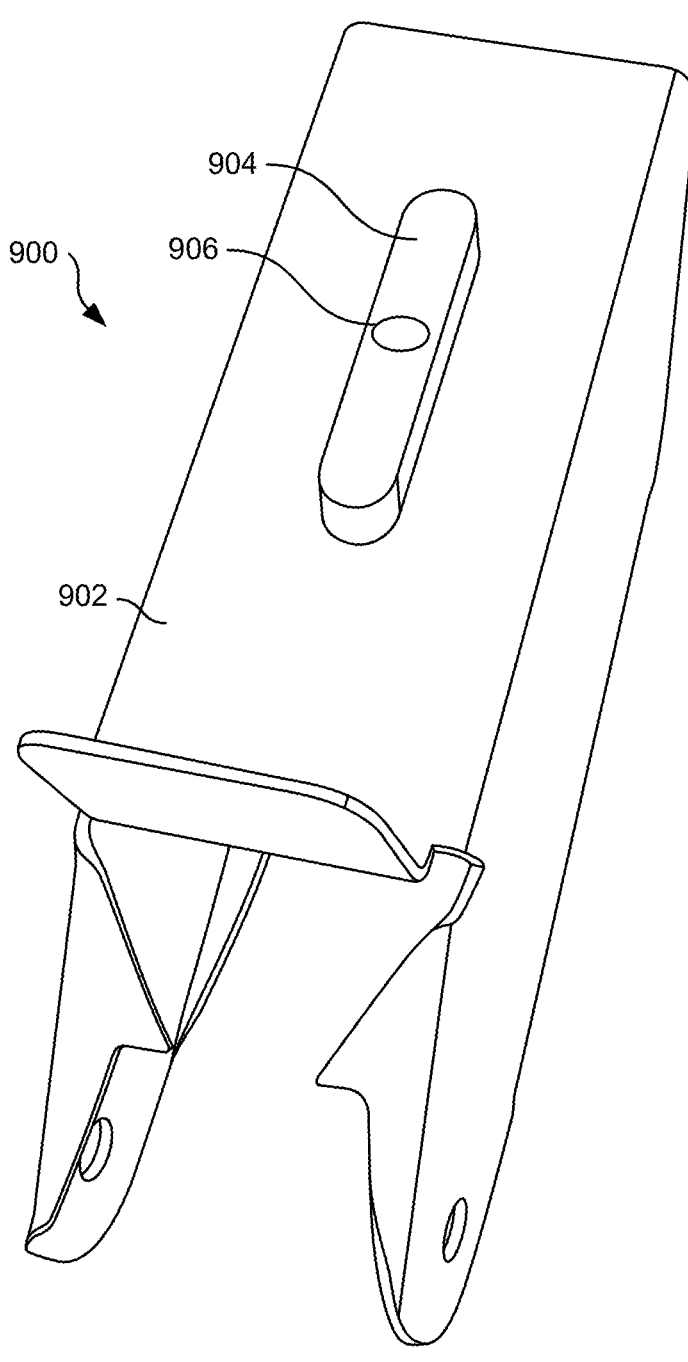
FIG. 9

CLAMP FOR SECURING A SOLAR PANEL MODULE

BACKGROUND

The solar industry is growing worldwide and, as a result, more efficient structures are desirable for mounting photo-voltaic modules or solar panel modules to a structure, such as a roof of a home or other building. While different structures are known, there is a desire to reduce their complexity. Therefore, there is a need for improved equipment to mount solar panel modules.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. The components, devices, and/or apparatuses depicted in the accompanying figures are not to scale and components within the figures may be depicted not to scale with each other.

FIG. 2A illustrates a first end view of the clamp of FIG. 1, according to embodiments of the present disclosure.

FIG. 2B illustrates a second end view of the clamp of FIG. 1, according to embodiments of the present disclosure.

FIG. 9 illustrates an alternative mount that may be used to attach the solar panel module to a rail, according to embodiments of the present disclosure.

DETAILED DESCRIPTION

Figure 1:
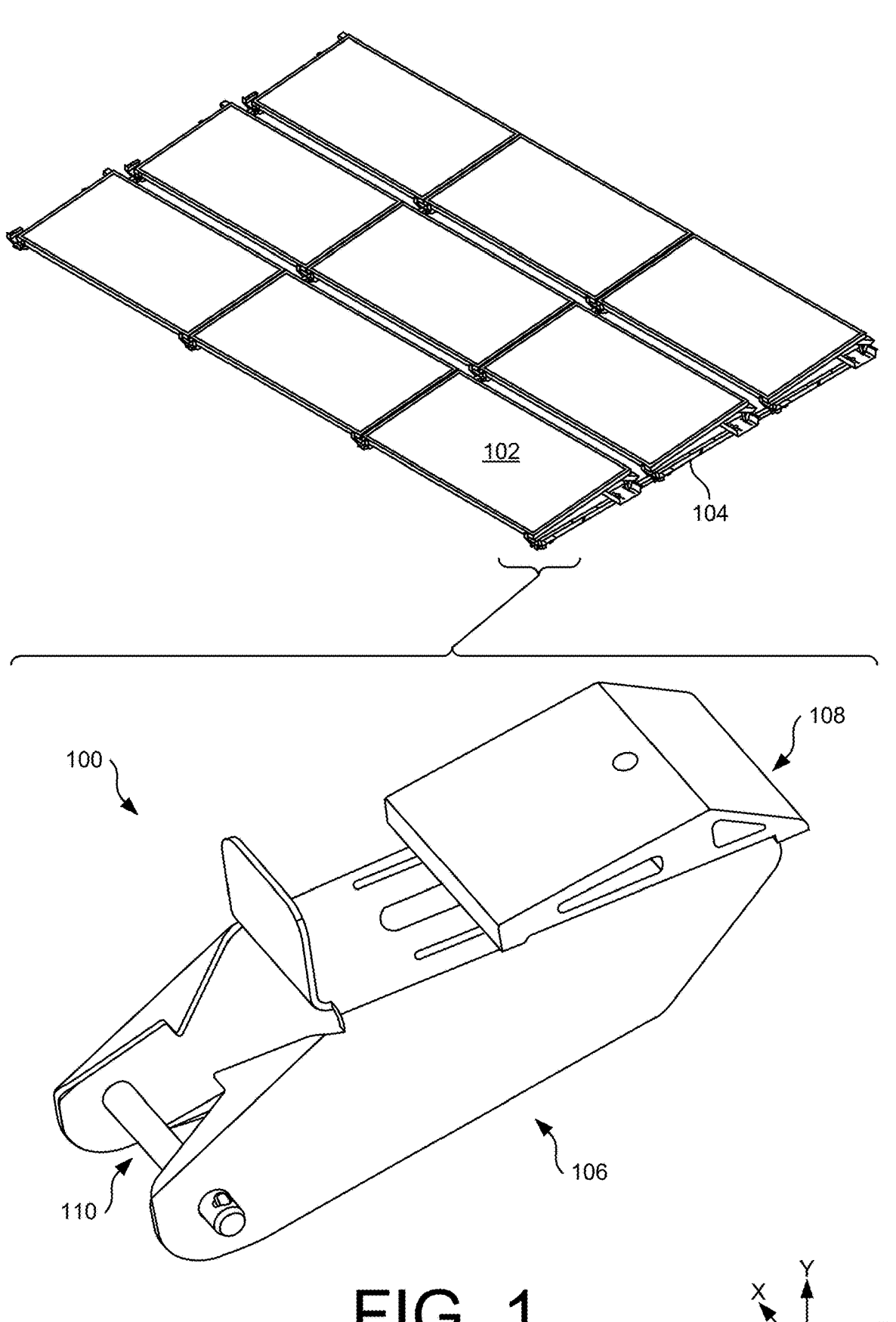
FIG. 1 illustrates an example clamp for attaching a solar panel module to a rail, according to embodiments of the present disclosure.

This application is directed, at least in part, to a clamp for securing solar panel modules, according to an embodiment of the present disclosure. In an embodiment, the clamp may include a mount that attaches (e.g., couples, secures, connects, etc.) to a rail, and a connector that secures a solar panel module to the mount. The connector may be configured to transition, or may be movable, between a first position in which the solar panel module is placed on the mount, and a second position in which the solar panel module is secured to the mount (or secured by the clamp). The first position may correspond to an unlocked, unfastened, or unclamped state of the clamp, while the second position may correspond to a locked, fastened, or clamped state of the clamp. In an embodiment, the connector may slide between the first position and the second position, with the assistance of an installer. A fastener, such as a bolt, may be used to attach the connector to the mount. The fastener may also be tightened once the connector moves to the second position to secure the solar panel module between the connector and the mount. Moreover, the mount may define one or more channels in which pins, for example, of the connector are disposed. An engagement between the pins and the channels may maintain an alignment of the connector relative to the mount, as the connector moves between the first position and the second position, as well as while the fastener is tightened to secure the solar panel module.

In an embodiment, the rail may be secured to a surface, such as a roof, on which the solar panel modules are disposed. For example, the rail may be fastened (e.g., via screws, brackets, etc.) into the surface. Any number of rails may be disposed on the surface, and any number of solar panel modules may be disposed across the rails. In an embodiment, the solar panel modules may be supported, anchored, secured, etc. to two of the rails. For example, the solar panel modules may be supported along one side by a first rail and may be supported along a second side, opposite the first side, by a second rail. In an embodiment, the solar panel modules may be supported at locations inboard of the solar panel modules, known as quarter points, or proximate to, corners of the solar panel modules.

The clamp, as introduced above, may include the mount that attaches to the rail. In an embodiment, the mount may include a base on which the solar panel module, or a frame thereof, is disposed. For example, the solar panel module may reside, rest, etc. on the base of the mount. The base may define the one or more channels for receiving the pins of the connector. In an embodiment, the base defines a first channel in which a first pin of the connector is disposed and a second channel in which a second pin of the connector is disposed. As will be explained herein, when the connector attaches to the mount, the first pin and the second pin may be disposed within the first channel and the second channel, respectively, in order to maintain an alignment of the connector relative to the mount. Moreover, the first pin may translate, move, etc. within the first channel and the second pin may translate, move, etc. within the second channel as the connector moves from the first position and the second position. However, although described as including two of the channels, in an embodiment, the base may include a single channel in which a pin of the connector is disposed.

The base may also define a slot (e.g., channel, passageway, etc.) for receiving the fastener that attaches the connector and the mount together. In an embodiment, the slot may be located between (e.g., interposed) the first channel and the second channel. The first channel, the second channel, and the slot may be parallel to one another. The fastener may be disposed through the slot, and into the connector, for attaching the connector to the mount. Moreover, prior to tightening the fastener, the fastener may translate within the slot as the connector moves from the first position to the second position. In an embodiment, a spring is disposed about the fastener and against the base to provide a biasing force against the mount to maintain a position of the fastener and/or the connector prior to fastening.

The mount may also define one or more through holes (e.g., channel, opening, holes, etc.). In an embodiment, the through holes are disposed through one or more flanges (e.g., sidewalls, extensions, etc.) of the mount. For example, a first flange and a second flange may extend from the base, where the first flange may include a first through hole and the second flange may include a second through hole. The first flange and the second flange may extend from the base. A fastening mechanism, such as a pin, fastener (e.g., bolt), etc. may be disposed through the one or more through holes for securing the mount (or the clamp) to the rail. The fastening mechanism may additionally be disposed through openings, holes, etc. in the rail, or brackets attached to the rail, in order to secure the mount to the rail. In an embodiment, the mount may rotate about the fastening mechanism. For example, during installation, the mount may be in an upright position relative to the rail. Once the solar panel module is secured, the mount may be rotated to a downward position. Between the upright position and the downward position, the mount may rotate about the fastening mechanism.

In an embodiment, the mount may define a receptacle in which a portion of the rail is disposed. The receptacle may be defined at least in part by the base, the first flange, and the second flange. In the downward position of the mount, the portion of the rail may reside within the receptacle, between the first flange and the second flange. In an embodiment, the base, the first flange, and/or the second flange may engage with sides, surfaces, etc. of the rail for maintaining an orientation, position, etc. of the clamp on the rail.

In an embodiment, the mount may include a lip that engages with the solar panel module. The lip may represent a flange, rib, shelf, etc. that extends from the base, in a direction opposite, or transverse, to the first flange and the second flange. The solar panel module may abut or rest against the lip for seating the solar panel module on the mount. For example, as the solar panel module is placed on the base, the solar panel module may be slid to abut against the lip. During transitioning of the connector from the first position to the second position, the connector may be brought into closer proximity with the lip.

The connector includes the first pin and the second pin that are configured to be disposed within the first channel and the second channel, respectively. The first pin and the second pin may represent posts, columns, protrusions, tabs, prongs, etc. formed within, that extend from, or attach to the connector. The first channel and the second channel may be sized to accommodate the first pin and the second pin. As introduced above, the first pin and the second pin may translate within the first channel and the second channel, respectively, as the connector moves between the first position and the second position. The engagement between the first pin and the second pin within the first channel and the second channel, respectively, may prevent the connector from reorienting (e.g., twisting, rotating, etc.) during the tightening of the fastener. For example, as the fastener is tightened to secure the solar panel module to the mount, a rotational force may be imparted to the connector. However, the positioning of the first pin and the second pin within the first channel and the second channel, respectively, may resist such force to maintain an alignment of the connector. Accordingly, the connector may not rotate as the fastener is fastened.

The first pin and the second pin may also permit the connector to be easily slid between the first position and the second position. For example, the first pin and the second pin may translate within the first channel and the second channel, respectively, as the connector moves between the first position and the second position. The first pin may move from a first end to a second end of the first channel as the connector moves from the first position to the second position. Likewise, the second pin may move from a first end to a second end of the second channel as the connector moves from the first position to the second position. Although the connector is described as including two of the pins (e.g., the first pin and the second pin), more than or less than two of the pins may be included. In such instances, the mount may include a corresponding number of channels to receive the pins.

The connector defines a passage (e.g., opening, channel, etc.) for receiving the fastener. The passage may align with the slot in the mount for receiving the fastener. In an embodiment, the passage may be threaded to receive the fastener, or the fastener may be attached to the connector via a nut engaging with the fastener. The connector may also define lips, projections, flanges, shelves, etc. that engage with surfaces, edges, etc. of the solar panel module and/or the mount. For example, the connector may define a shelf that engages with an edge of the mount in the first position of the connector. Such engagement may maintain the connector in the first position while the solar panel module is being placed on the mount, such that the connector does not interfere with the placement of the solar panel module onto the mount. Moreover, the spring disposed about the fastener may urge the connector against the mount to maintain a position of the connector. After placement of the solar panel module onto the base, to transition the connector to the second position, the lip may be disengaged (e.g., slide over, etc.) with the edge to enable the connector to transition to the second position. In an embodiment, however, the base may define the lip that is engaged and disengaged with an edge of the connector during transitioning of the connector between the first position and the second position, respectively.

In an embodiment, the installer may manually move, prior to fastening the fastener, the connector from the first position to the second position. For example, the installer may grasp, grab, etc. the connector and slide the connector to the second position. After moving to the second position, the installer may utilize tools (e.g., ratchet, driver, etc.) to tighten the fastener. During tightening, the solar panel module (e.g., the frame thereof) may become compressed, clamped, etc. between the connector and the base of the mount, thereby securing the solar panel module. In an embodiment, the connector may be referred to as a "slide" or a "slidable connector" in that the connector may slide between the first position and the second position.

In an embodiment, the clamp may be considered a "south clamp," where south is understood in the industry to represent an orientation along a solar panel module to position the solar panel module for ideal sunlight. For example, the clamp may be disposed on the south side of the solar panel module. Additional, mounts, clamps, brackets, etc. may be disposed on a north side of the solar panel module, where such mounts, clamps, brackets, etc. may be considered a "north mount," "north clamp," and so forth. However, although a particular orientation is described, other orientations and/or positions of the clamp are envisioned.

Although a particular engagement between the mount and the connector is described, other variations are envisioned. For example, the mount and/or the connector may include other features, channels, fasteners, etc. that engage to maintain an alignment, orientation, etc. between the mount and the connector. As an example, carriage bolts, flat-sided bolts, flat-sided bushings, etc. may be used to resist rotation of the connector while the fastener is fastened and/or unfastened. In these instances, the mount and/or the connector may include suitable components for engaging or receiving such components. The clamp may also be used with other brackets, mounts, etc., in addition to or alternative from the rail that attaches to the surface.

In an embodiment, the clamp may be formed from any suitable materials, such as metal, composites, plastic, etc. In an embodiment, the mount may be formed from a piece of metal (e.g., steel, aluminum, etc.) that is stamped, bent, etc. to form the base, first flange, second flange, lip, etc. Post-processing techniques, for example, drilling may form through holes, channels, slots, etc. In an embodiment, the connector may be formed via extrusion, injection molding, die casting, etc. Post-processing techniques, for example, milling may form the lip, holes for the pins, and so forth.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting embodiments. The features illustrated or described in connection with one embodiment may be combined with the features of other embodiments. Such modifications and variations are intended to be included within the scope of the appended claims.

FIG. 1 illustrates an example clamp 100 that may be used to attach (e.g., secure, connect, mount, couple, etc.) a solar panel module 102 to a rail 104, according to an embodiment of the present disclosure. In an embodiment, the clamp 100 may include a mount 106 and connector 108 that attaches to the mount 106. As will be explained herein, the connector 108 may clamp the solar panel module 102 between the mount 106 and the connector 108, thereby securing the solar panel module 102 to the rail 104. In the detailed view in FIG. 1, however, the solar panel module 102 is shown as disconnected from the clamp 100.

The connector 108 may be configured to transition, or be movable, between a first position in which the solar panel module 102 is placed on the mount 106 and/or unsecured to the clamp 100, and a second position in which the solar panel module 102 is secured to the clamp 100. In an embodiment, the first position may correspond to an unlocked state of the clamp 100, while the second position may correspond to a locked state of the clamp 100. The connector 108 may slide between the first position and the second position (e.g., in the Z-direction). As will be explained herein, a fastener, such as a bolt, may be used to attach the connector 108 to the mount 106. The fastener may also be tightened once the connector 108 is moved to the second position to secure the solar panel module 102. In the detailed view in FIG. 1, the connector 108 is shown in the first position, so as to be in position to receive the solar panel module 102.

In an embodiment, the rail 104 may be secured to a surface, such as a roof, on which the solar panel module 102 is disposed. For example, the rail 104 may be fastened (e.g., via screws, brackets, etc.) into the surface. Additionally, or alternatively, the rail 104 may be held to the surface via ballast(s). Still, in an embodiment, the solar panel module 102 may be fastened directly to the surface, without the use of the rails 104. Any number of the rails 104 may be disposed on the surface, and any number of the solar panel modules 102 may be disposed across the rails 104. In an embodiment, the solar panel modules 102 may be supported, anchored, secured, etc. to two of the rails 104. For example, the solar panel modules 102 may be supported along one side by a first rail, and may be supported along a second side, opposite the first side, by a second rail. In an embodiment, the solar panel modules 102 may be supported at, or proximate to, corners of the solar panel modules 102. However, although described as being used in conjunction with the rail 104, the clamp 100 may be used with other brackets, mounts, etc., whether attached to the surface or not.

In an embodiment, the clamp 100 may be considered a "south clamp", where in the industry it is understood that "south" describes system components or system features oriented on the downslope edge or side of a sloped solar panel module. It is understood that the downslope edge or side of the solar panel module is ideally oriented south for receipt of maximum sunlight. For example, the clamp 100 may be disposed on the south side of the solar panel module 102. Additional mounts, clamps, brackets, etc. may be disposed on the north side of the solar panel module 102, where such mounts, clamps, brackets, etc. may be considered a "north mount," "north clamp," and so forth. However, although a particular orientation is described, other orientations and/or positions of the clamp 100 are envisioned.

The clamp 100 may include a fastening mechanism 110, such as a pin, fastener (e.g., bolt), etc. may be disposed through the one or more through holes for securing the mount 106 (or the clamp 100) to the rail 104. For example, the fastening mechanism 110 may additionally be disposed at least partially through the mount 106 and the rail 104 in order to secure the mount 106 to the rail 104. In an embodiment, the mount 106 may be configured to rotate or hinge about the fastening mechanism 110. For example, during installation, the mount 106 may be in an upright position relative to the rail 104. Once the solar panel module 102 is secured to the mount 106, the mount 106 may be rotated to a downward position (e.g., about the X-axis). Between the upright position and the downward position, the mount 106 may rotate about the fastening mechanism 110. In FIG. 1, the mount 106, or more generally, the clamp 100, is shown in the downward position. The mount 106 may therefore be hingedly connected to the rail 104.

In an embodiment, the clamp 100 and the rail 104 may be collectively referred to as a mounting system for securing the solar panel module 102 to the surface. In such instances, the mounting system may include other components, such as brackets, wires, ballasts, wind deflectors, etc. for securing the solar panel module 102 and/or enabling their functionality.

FIGS. 2A-2G illustrate various views of the clamp 100, according to embodiments of the present disclosure. As introduced above, the clamp 100 includes the mount 106, the connector 108, and the fastening mechanism 110. Additionally, a fastener 200 may be used to attach the connector 108 to the mount 106. The fastener 200 may be at least partially disposed through the mount 106 and into the connector 108.

The mount 106 may include a base 202, a first flange 204, a second flange 206, and a lip 208. The mount 106 may be made up of a single piece of material that is bent, stamped, etc., so as to be formed as a unitary, continuously formed body shaped by bending, stamping, punching, etc. of a sheet material to form the base 202, the first flange 204, the second flange 206, and the lip 208. As will be explained herein, the connector 108 may engage with, or rest on, the base 202 of the mount 106. The first flange 204 and the second flange 206 may extend from the base 202 in a first direction, while the lip 208 may extend from the base 202 in a second direction opposite, traverse, etc. to the first direction.

The mount 106 may define a receptacle 210 in which the rail 104 is configured to be at least partially disposed. In an embodiment, the receptacle 210 may be formed by the base 202, the first flange 204, and the second flange 206. In the downward position of the clamp 100, the base 202 may engage with a top of the rail 104, the first flange 204 may engage with or be disposed along a first side of the rail 104, and the second flange 206 may engage with or be disposed along a second side of the rail 104. The engagement between mount 106 and the rail 104 may maintain an orientation, position, etc. of the clamp 100 on the rail 104.

Figure 2C:
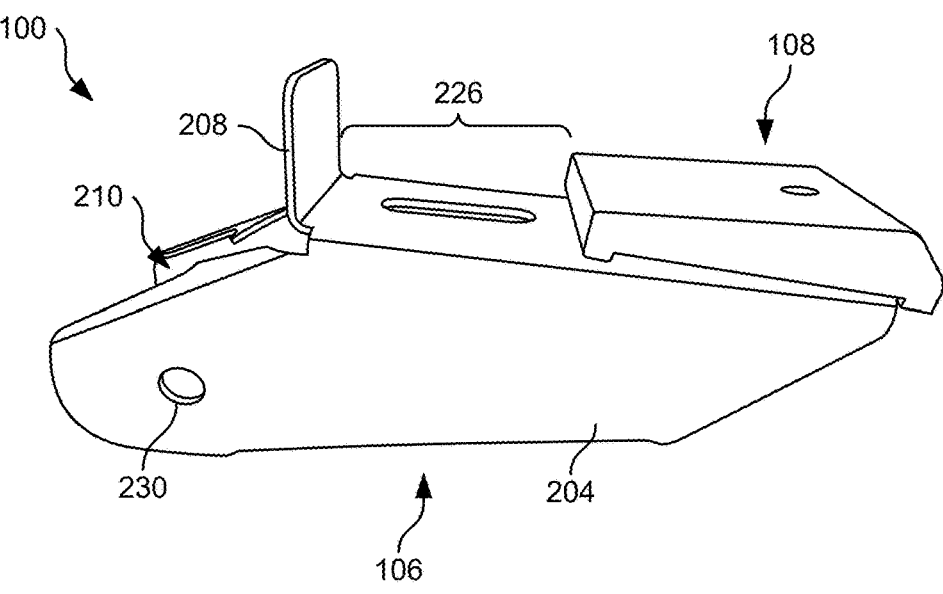
FIG. 2C illustrates a side view of the clamp of FIG. 1, showing an example connector of the clamp in a first position, according to embodiments of the present disclosure.
Figure 2D:
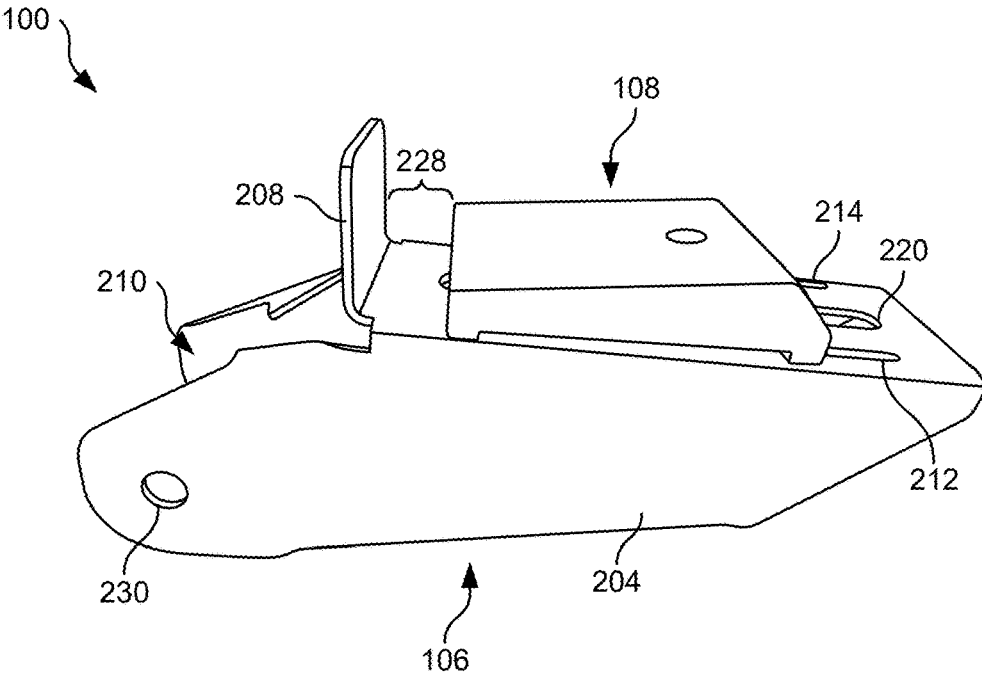
FIG. 2D illustrates a side view of the clamp of FIG. 1, showing the connector in a second position, according to embodiments of the present disclosure.

The mount 106 may include a first channel 212 and a second channel 214 for receiving a first pin 216 and a second pin 218 of the connector 108. The first channel 212 and the second channel 214 may be disposed through, or defined by, the base 202. As shown in FIGS. 2F and 2G, the first pin 216 and the second pin 218 may be disposed within the first channel 212 and the second channel 214, respectively. The base 202 may additionally define a slot 220 through which the fastener 200 is disposed, so as to be threaded into the connector 108, for example. The slot 220 may be located between (e.g., in the X-direction) the first channel 212 and the second channel 214.

A biasing member 222 may be disposed about the fastener 200 to urge the connector 108 against the mount 106 (e.g., in the Y-direction) to maintain the connector 108 in position. For example, the biasing member 222, which may represent a spring, may provide a biasing force against the mount 106 to maintain a position of the fastener 200 and/or the connector 108. A washer 224 may also be included and disposed between the base 202 and the biasing member 222.

The connector 108 is configured to transition between a first position and a second position. In the first position, the solar panel module 102 may be placed on the mount 106, such as on the base 202 and against the lip 208. In the second position, the solar panel module 102 may be secured between the connector 108 and the base 202. The first position may correspond to an unlocked state of the clamp 100, while the second position may correspond to a locked state of the clamp 100. FIGS. 2C and 2G illustrate the connector 108 in the first position, while FIGS. 2A, 2B, 2D, 2E, and 2F illustrate the connector 108 in the second position (although the solar panel module 102 is not shown).

In an embodiment, the connector 108 may slide, translate, move, etc. between the first position and the second position (e.g., in the Z-direction). In an embodiment, the connector 108 may be referred to as a "slide" in that the connector 108 may slide between the first position and the second position. In an embodiment, an installer may manually move, prior to fastening the fastener 200, the connector 108 from the first position to the second position. For example, the installer may grasp, grab, etc. the connector 108 and slide the connector 108 to the second position. After moving to the second position, the installer may utilize tools (e.g., ratchet, driver, etc.) to tighten the fastener 200. During tightening, the solar panel module 102 (e.g., the frame thereof) may become compressed, clamped, etc. between the connector 108 and the base 202 of the mount 106, thereby securing the solar panel module 102. As such, the fastener 200 may be tightened once moved to the second position to secure the solar panel module 102. During movement of the connector 108 from the first position to the second position, the fastener 200 may translate within the slot 220.

The connector 108 includes the first pin 216 and the second pin 218, which are disposed in the first channel 212 and the second channel 214, respectively. An engagement between the first pin 216 with the first channel 212, and the second pin 218 with the second channel 214, may maintain an alignment of the connector 108 relative to the mount 106, for example, as the connector 108 moves between the first position and the second position. For example, as the connector 108 moves between the first position and the second position, the first pin 216 may move between ends of the first channel 212 and the second pin 218 may move between ends of the second channel 214.

In an embodiment, a first distance 226 may be disposed between an end of the connector 108 and the lip 208 in the first position (as shown in FIG. 2C). As the connector 108 slides to the second position, so as to secure the solar panel module 102 against the lip 208, a second distance 228 may be disposed between the end of the connector 108 and the lip 208. The second distance 228 may be less than the first distance 226.

The engagement between the first pin 216 and the second pin 218 within the first channel 212 and the second channel 214, respectively, may prevent the connector 108 from reorienting (e.g., twisting, rotating, etc.) during tightening of the fastener 200. For example, as the fastener 200 is tightened in the second position to secure the solar panel module 102 to the mount 106, a rotational force may be imparted to the connector 108. However, the positioning of the first pin 216 and the second pin 218 within the first channel 212 and the second channel 214, respectively, may resist such force to maintain an alignment of the connector 108 on the mount 106 in order to clamp the solar panel module 102.

Figure 2E:
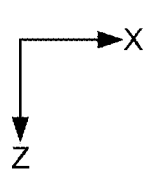
FIG. 2E illustrates a top view of the clamp of FIG. 1, according to embodiments of the present disclosure.
Figure 2F:
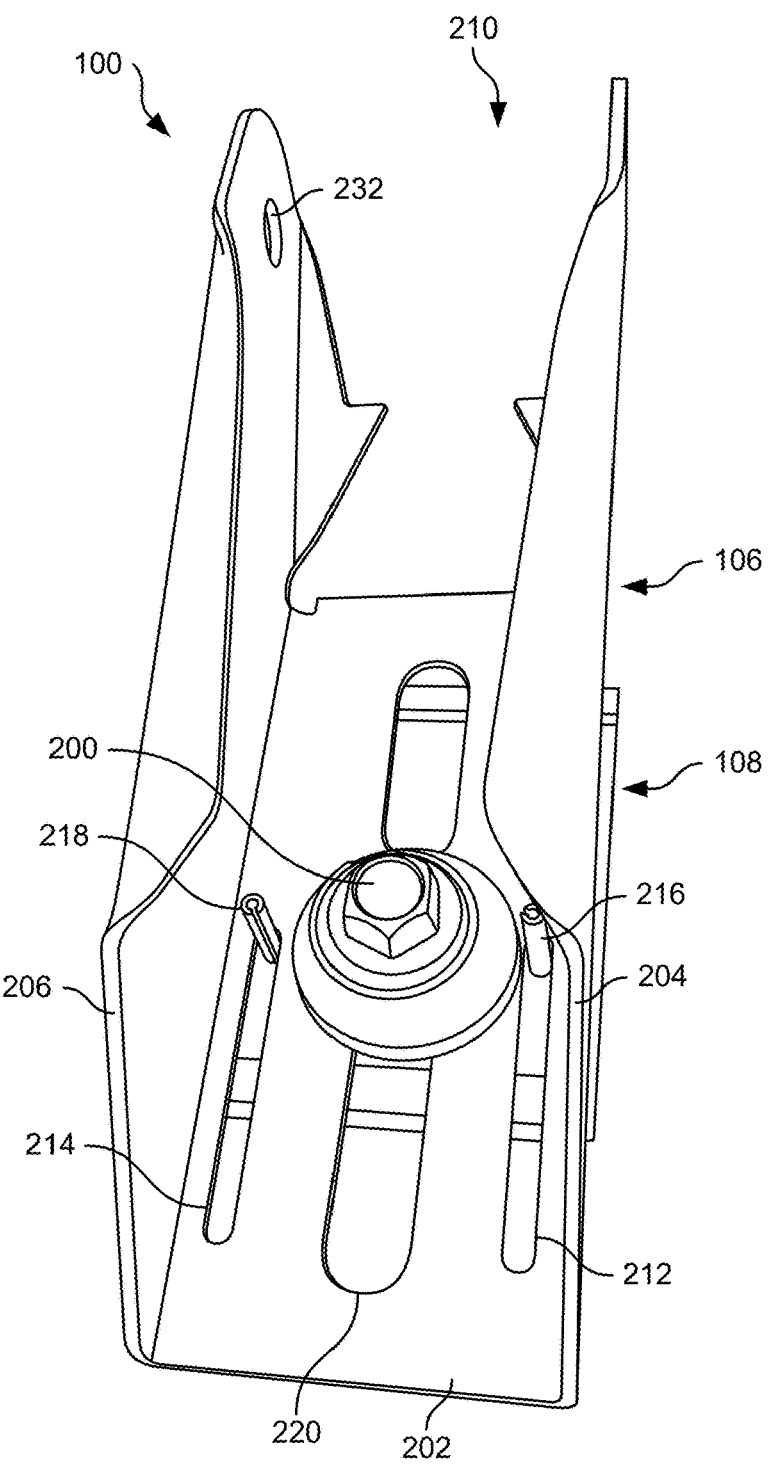
FIG. 2F illustrates a bottom view of the clamp of FIG. 1, showing the connector of the clamp in the second position, according to embodiments of the present disclosure.
Figure 2F:
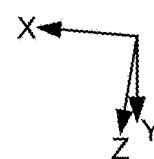
Figure 2G:
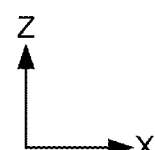
FIG. 2G illustrates a bottom view of the clamp of FIG. 1, showing the connector of the clamp in the first position, according to embodiments of the present disclosure.

The fastening mechanism 110, which is shown in FIGS. 2A, 2B, and 2E, may represent a pin, fastener, etc. The fastening mechanism 110 may be disposed through a first through hole 230 formed in the first flange 204, and a second through hole 232 formed in the second flange 206. The first through hole 230 and the second through hole 232 may represent channels, passages, openings, holes, etc.

In an embodiment, the mount 106 may define a single channel, as compared to two channels (e.g., the first channel 212 and the second channel 214). The single channel may be disposed on either side of the slot 220 and may be configured to receive a pin (e.g., a single pin) of the connector 108. In such instances, an engagement between the pin and the single channel may align the connector 108 to the mount 106 and arrest rotation of the connector 108 during tightening of the fastening mechanism 110. Alternatively, in an embodiment, the mount 106 may include more than two channels and the connector may include more than two pins.

Figure 3A:
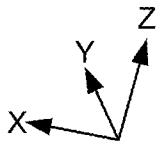
FIG. 3A illustrates an isometric top view of an example mount of the clamp of FIG. 1, according to embodiments of the present disclosure.
Figure 3B:
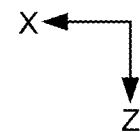
FIG. 3B illustrates an isometric bottom view of the mount of the clamp of FIG. 1, according to embodiments of the present disclosure.
Figure 3C:
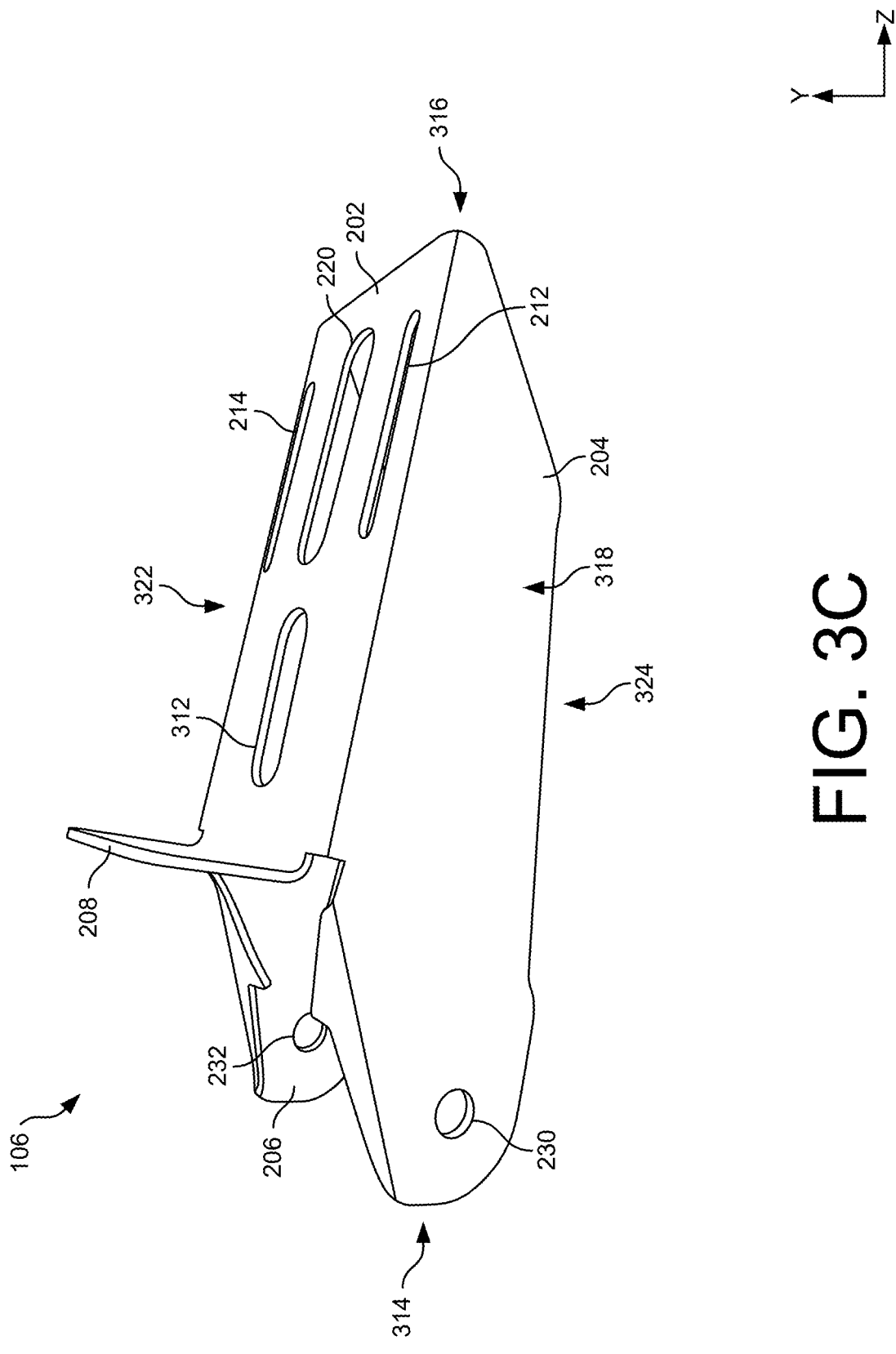
FIG. 3C illustrates a side view of the mount of the clamp of FIG. 1, according to embodiments of the present disclosure.
Figure 4A:
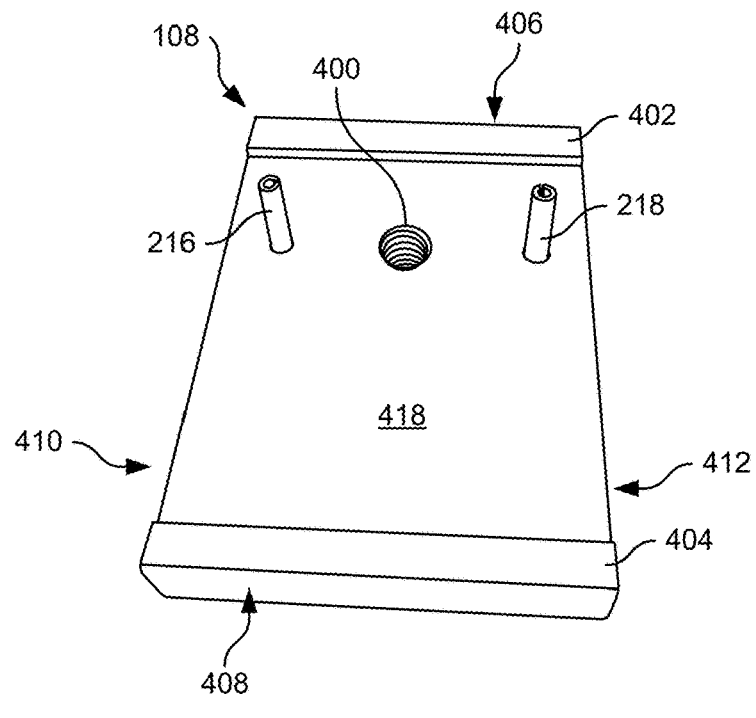
FIG. 4A illustrates a first side view of an example connector of the clamp of FIG. 1, according to embodiments of the present disclosure.
Figure 4B:
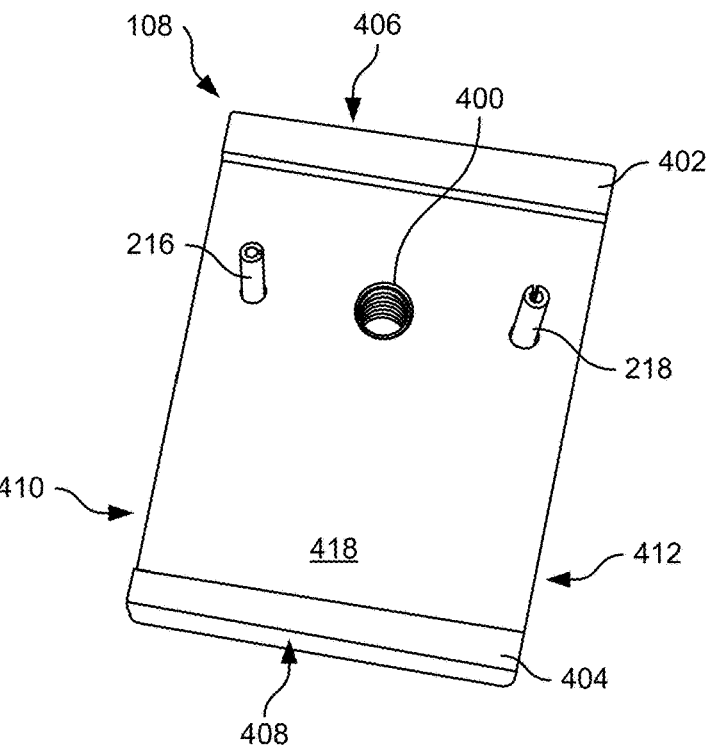
FIG. 4B illustrates a second side view of the connector of the clamp of FIG. 1, according to embodiments of the present disclosure.
Figure 4B:
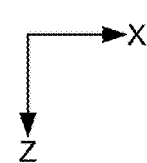
Figure 4C:
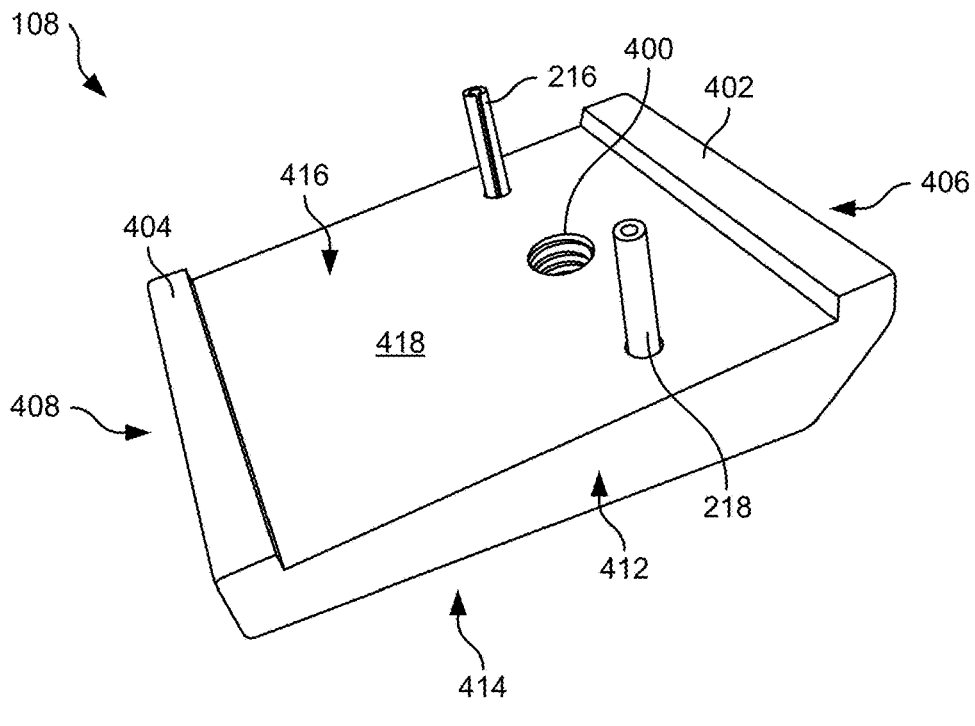
FIG. 4C illustrates a third side view of the connector of the clamp of FIG. 1, according to embodiments of the present disclosure.
Figure 4D:
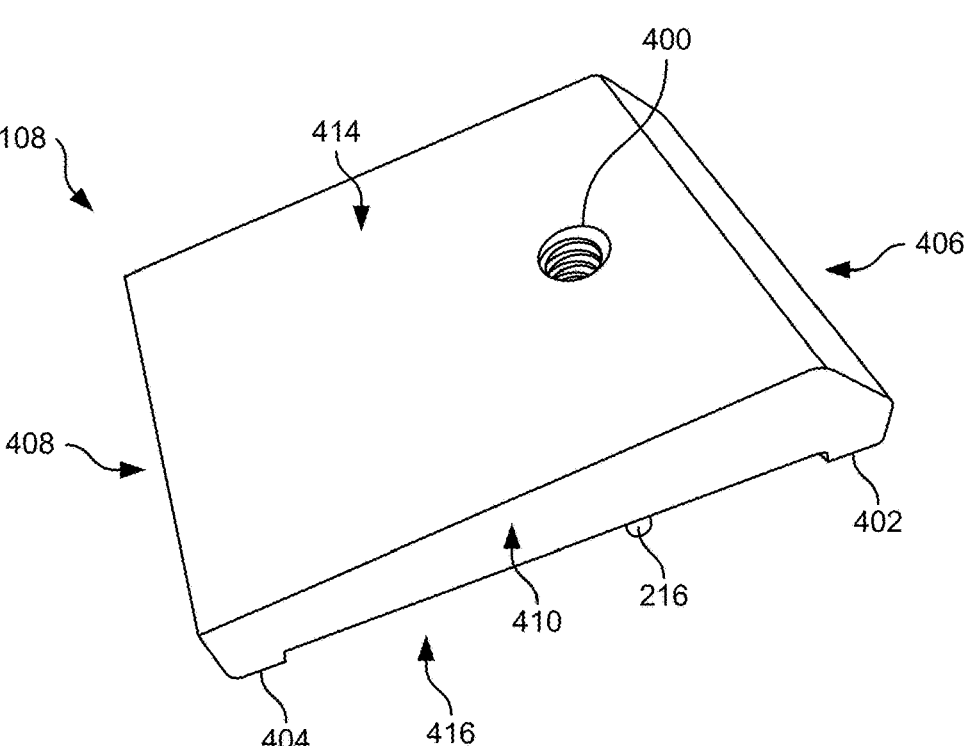
FIG. 4D illustrates a fourth side view of the connector of the clamp of FIG. 1, according to embodiments of the present disclosure.
Figure 4D:
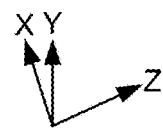

FIGS. 3A-3C illustrate various views of the mount 106, according to embodiments of the present disclosure. The mount 106 defines the base 202, the first flange 204, the second flange 206, and the lip 208. The base 202 provides a surface on which the solar panel module 102, or a frame thereof, is received. For example, the solar panel module 102 may rest on the base 202. Additionally, the solar panel module 102 may be disposed against the lip 208. The lip 208 may represent a flange, rib, shelf, etc. that extends from the base 202. The solar panel module 102 may abut or rest against the lip 208 for seating the solar panel module 102 on the mount 106. During transitioning of the connector 108 from the first position to the second position, the connector 108 may be brought into closer proximity with the lip 208.

The base 202 may define the first channel 212 and the second channel 214 for receiving the first pin 216 and the second pin 218, respectively. As introduced above, when the connector 108 attaches to the mount 106, the first pin 216 and the second pin 218 may be disposed within the first channel 212 and the second channel 214, respectively, in order to maintain an alignment of the connector 108 relative to the mount 106. The first pin 216 may translate, move, etc. within the first channel 212 and the second pin 218 may translate, move, etc. within the second channel 214 as the connector 108 moves from the first position and the second position. For example, the first pin 216 may translate between a first end 300 and a second end 302 of the first channel 212, and the second pin 218 may translate between a first end 304 and a second end 306 of the second channel 214. In the first position of the connector 108, the first pin 216 and the second pin 218 may be disposed adjacent to the first end 300 and the first end 304, respectively. In the second position of the connector 108, the first pin 216 and the second pin 218 may be disposed adjacent to the second end 302 and the second end 306, respectively.

The base 202 may also define the slot 220 (e.g., channel, passageway, etc.) for receiving the fastener 200 that attaches the connector 108 and the mount 106 together. In an embodiment, the slot 220 may be located between the first channel 212 and the second channel 214 (e.g., in the X-direction). The fastener 200 may be disposed through the slot 220, and into the connector 108, for attaching the connector 108 to the mount 106. In an embodiment, the first channel 212, the second channel 214, and the slot 220 include a similar length (e.g., in the Z-direction). In an embodiment, the first channel 212 and the second channel 214 include a width (e.g., in the X-direction), that is less than a width of the slot 220 (e.g., in the X-direction). The first channel 212, the second channel 214, and the slot 220 may be parallel to one another.

The first flange 204 and the second flange 206 extend from the base 202. The first flange 204 may define the first through hole 230, while the second flange 206 may define the second through hole 232. The fastening mechanism 110 may be disposed through the first through hole 230 and the second through hole 232 for securing the mount to the rail 104. The mount 106 defines the receptacle 210 in which a portion of the rail 104 is disposed. The receptacle 210 may be defined at least in part by the base 202, the first flange 204, and the second flange 206. In the downward position of the mount 106, the portion of the rail 104 may reside within the receptacle 210. The first flange 204 and the second flange 206 may represent sidewalls of the mount 106 disposed alongside sides of the rail 104.

The mount 106 may define a first tab 308 and a second tab 310. In an embodiment, the first tab 308 may be defined by the first flange 204, and/or the second tab 310 may be defined by the second flange 206. The first tab 308 and the second tab 310 may engage with the rail 104, for example, in the upright position during installation, to prevent further rotation of the mount 106 (e.g., in a counterclockwise direction about the X-axis). However, once the solar panel module 102 is secured to the mount 106, the mount 106 may be rotated to a downward position (e.g., in a clockwise direction about the X-axis). Between the upright position and the downward position, the mount 106 may rotate about the fastening mechanism 110.

In an embodiment, the mount 106 may define a slot 312. A fastener (not shown) may be disposed through the slot 312 and into a hole (e.g., aperture) in a return flange of a frame of the solar panel module 102. In such instances, the fastener 200 may additionally or alternatively be used to attach the solar panel module 102 to the mount 106. In an embodiment, the slot 312 may be aligned (e.g., in the X-direction) with slot 220.

In an embodiment, the mount 106 includes a first end 314, a second end 316 spaced apart from the first end 314 (e.g., in the Z-direction), a first side 318, a second side 320 spaced apart from the first side 318 (e.g., in the X-direction), a top 322, and a bottom 324 opposite the top 322 (e.g., in the Y-direction). In an embodiment, the base 202 may be disposed along the top 322, the first flange 204 may be disposed along the first side 318, and the second flange 206 may be disposed along the second side 320. The first channel 212, the second channel 214, and the slot 220 may be located closer to the second end 316 as compared to the first end 314. The first through hole 230 and the second through hole 232 may be located closer to the first end 314 as compared to the second end 316.

In an embodiment, the mount 106 may be formed from a piece of metal (e.g., steel, aluminum, etc.) that is stamped, bent, etc. to form the base 202, first flange 204, second flange 206, lip 208, etc. Post-processing techniques, for example, drilling may form the first through hole 230, the second through hole 232, the first channel 212, the second channel 214, the slot 220, etc.

FIGS. 4A-4D illustrate various views of the connector 108, according to embodiments of the present disclosure. As introduced above, the connector 108 may include the first pin 216 and the second pin 218, which are configured to be disposed within the first channel 212 and the second channel 214, respectively. In an embodiment, a shape of the first pin 216 and the second pin 218 may be circular (e.g., X-Z plane), however, other shapes are envisioned. In an embodiment, the first pin 216 and the second pin 218 may represent dowels, spring pins, rods, prongs, etc. disposed in holes, slots, openings, etc. in the connector 108. For example, holes may be formed in the connector 108, and the first pin 216 and the second pin 218 may be pressed into the holes, welded to the connector 108, etc.

As introduced above, the first pin 216 and the second pin 218 may translate within the first channel 212 and the second channel 214, respectively, as the connector 108 moves between the first position and the second position. The engagement between the first pin 216 and the second pin 218 within the first channel 212 and the second channel 214, respectively, may prevent the connector 108 from reorienting (e.g., twisting, rotating, etc.) during tightening of the fastener 200. Additionally, the first pin 216 and the second pin 218 may also permit the connector 108 to be easily slid between the first position and the second position. Although the connector 108 is described as including two of the pins (e.g., the first pin 216 and the second pin 218), more than or less than two of the pins may be included. In such instances, the mount 106 may include a corresponding number of channels to receive the pins.

The connector 108 may define a passage 400 that receives an end of the fastener 200. The passage 400 may be threaded to receive the fastener 200. In an embodiment, the passage 400 may be located between the first pin 216 and the second pin 218. The passage 400 may also be aligned with the first pin 216 and the second pin 218 (e.g., in the Z-direction).

The connector 108 defines a first shelf 402 and a second shelf 404. The first shelf 402 may engage with the second end 316 of the mount 106 in the first position of the connector 108, for example, to prevent the connector 108 from moving to the second position while the solar panel module 102 is being placed on the mount 106. However, after placement of the solar panel module 102 on the mount 106, the first shelf 402 may be translated over the second end 316, onto a top of the base 202, and the connector 108 may be moved to the second position. The second shelf 404 may engage with tabs, ribs, grooves, return flanges, etc. of the frame of the solar panel module 102.

In an embodiment, the connector 108 includes a first end 406, a second end 408 spaced apart from the first end 406 (e.g., in the Z-direction), a first side 410, a second side 412 spaced apart from the first side 410 (e.g., in the X-direction), a top 414, and a bottom 416 opposite the top 414 (e.g., in the Y-direction). The first shelf 402 may be disposed at the first end 406, and extend between the first side 410 and the second side 412. The second shelf 404 may be disposed at the second end 408, and extend between the first side 410 and the second side 412. In an embodiment, the passage 400 may be disposed through the connector 108, between the bottom 416 and the top 414, or through less than an entirety of the connector 108. The passage 400 may be centrally located on the connector 108, between the first side 410 and the second side 412. In an embodiment, the first pin 216 and the second pin 218 may be located closer to the first end 406 than the second end 408. The first pin 216 may be located closer to the first side 410 as compared to the second pin 218, and/or the second pin 218 may be located closer to the second side 412 as compared to the first pin 216.

In an embodiment, the first pin 216 and the second pin 218 may be located on, or extend from, a surface 418 (e.g., bottom surface) of the connector 108. The first shelf 402 and/or the second shelf 404 may be formed in the surface 418. In an embodiment, the connector 108 may be formed via extrusion, injection molding, die casting, etc. Post-processing techniques, for example, milling may form the passage 400, for example.

FIGS. 5A-5E illustrate a sequence of operations for attaching the solar panel module 102 to the rail 104 using the clamp 100, according to embodiments of the present disclosure.

Figure 5A:
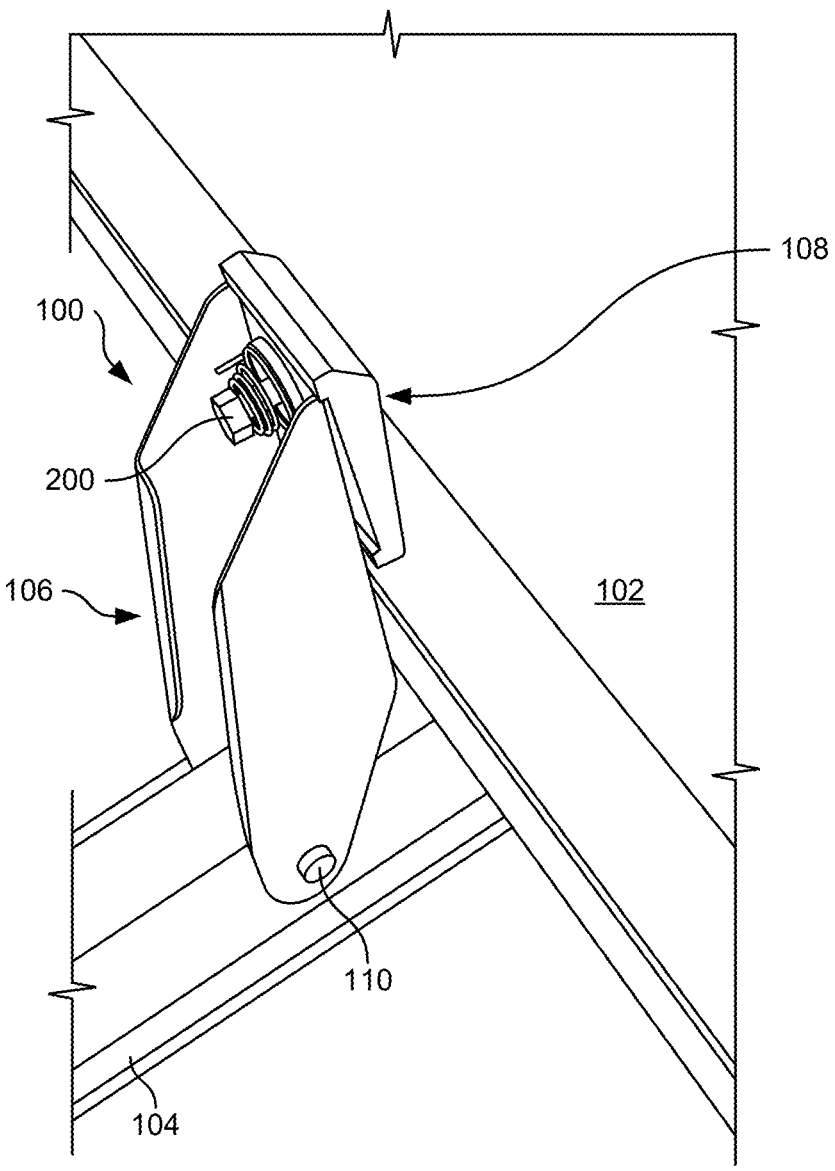
FIG. 5A illustrates an example use of the clamp of FIG. 1 for attaching the solar panel module to the rail, according to embodiments of the present disclosure.
Figure 5A:
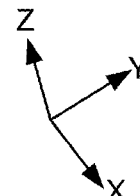

In FIG. 5A, the mount 106 is shown attached to the rail 104, using the fastening mechanism 110. For example, the mount 106 may be disposed over the rail 104, aligning the first through hole 230 and the second through hole 232 with holes in the rail 104. Therein, the fastening mechanism 110 may be disposed through the first through hole 230, the second through hole 232, and the holes in the rail 104. The mount 106 may be rotatable about the fastening mechanism 110, for example, to transition the clamp 100 from an upright position, as shown in FIG. 5A, to a downward position in which the rail 104 is at least partially received in the receptacle 210. In the upright position, the first tab 308 and/or the second tab 310 may engage with the top of the rail 104 to prevent rotation of the mount 106 and/or to keep the clamp 100 in the upright position.

The connector 108 is in the first position in FIG. 5A. At the first position, the first shelf 402 (or an edge thereof), may be disposed against the second end 316 of the mount 106. Such engagement may prevent the connector 108 moving to the second position before the solar panel module 102 is permitted to be placed on the mount 106 and against the lip 208. For example, as shown in FIG. 5A, the solar panel module 102 may abut, or rest on, the lip 208 to support the weight of the solar panel module 102 (e.g., in the Z-direction). The fastener 200 also attaches the connector 108 to the mount 106.

Figure 5B:
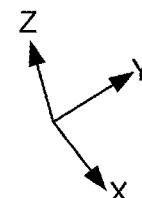
FIG. 5B illustrates an example use of the clamp of FIG. 1 for attaching the solar panel module to the rail, according to embodiments of the present disclosure.

In FIG. 5B, the connector 108 is shown in the second position. For example, from the first position in FIG. 5A, the connector 108 may be moved in a first direction 500 (e.g., in the Z-direction) to the second position. As the connector 108 moves to the second position, a flange 502 of the solar panel module 102 (or a frame thereof) may be disposed between the connector 108 and the mount 106, or the base 202 of the mount 106 (e.g., in the Y-direction). The second shelf 404 may be disposed over the flange 502 of the solar panel module 102. In an embodiment, a person installing the clamp 100 may use a tool 510 to engage the fastener 200 and move the fastener 200 within the slot 220 (e.g., in the first direction 500) to dispose the connector 108 at the second position. Additionally, or alternatively, the installer may grasp the connector 108 and push, for example, the connector 108 from the first position to the second position. Moreover, during movement of the connector 108 from the first position to the second position, the first pin 216 may move within the first channel 212 and the second pin 218 may move within the second channel 214.

Figure 5C:
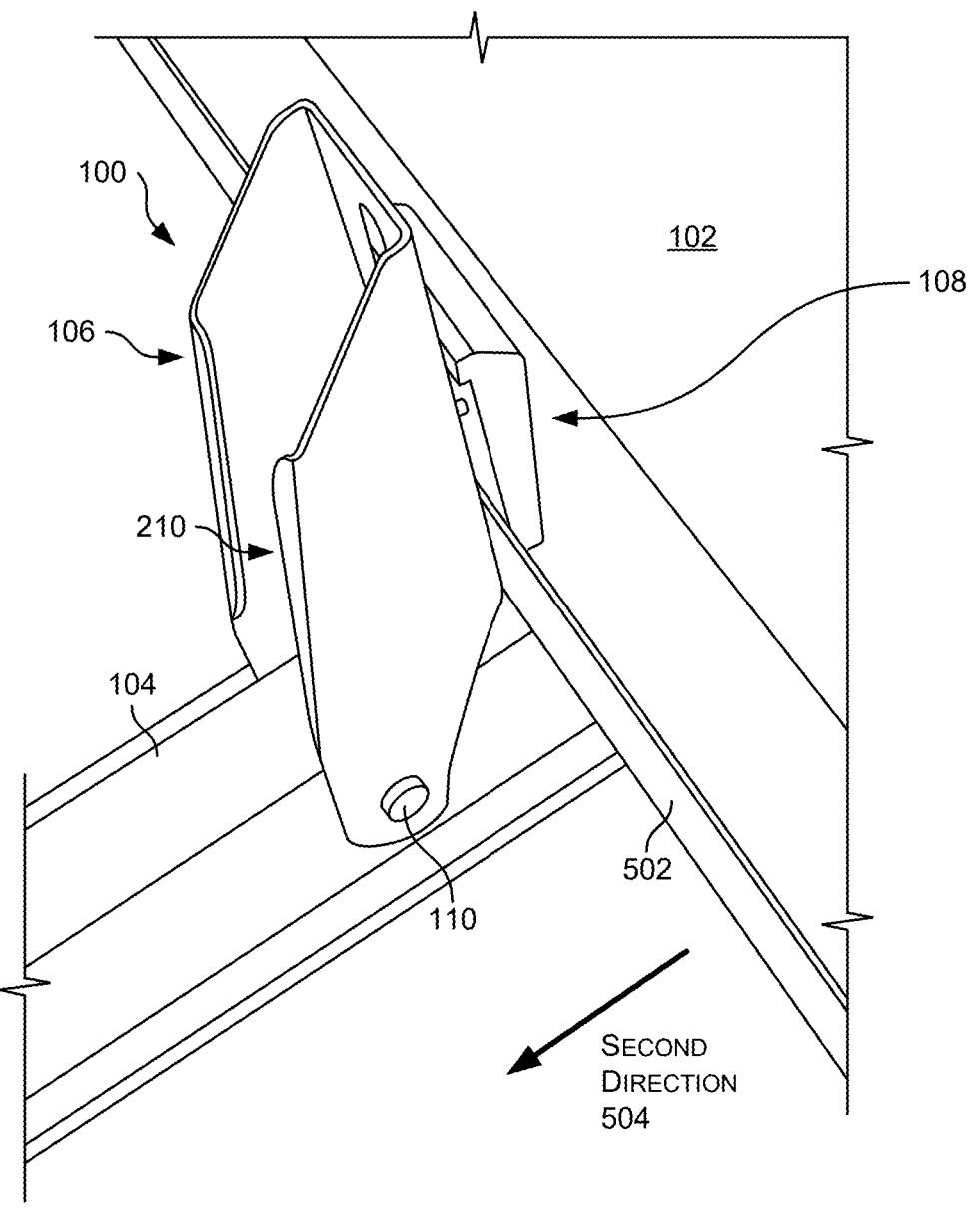
FIG. 5C illustrates an example use of the clamp of FIG. 1 for attaching the solar panel module to the rail, according to embodiments of the present disclosure.
Figure 5C:
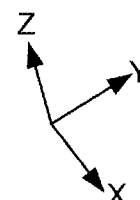

In FIG. 5C, the connector 108 is shown in the second position. At the second position, the tool 510 may be used to tighten the fastener 200. As the fastener 200 is tightened, the connector 108 may be urged in a second direction 504 (e.g., in the Y-direction), so as to clamp 100 (e.g., compress, pinch, etc.) the flange 502 between the connector 108 and the base 202 of the mount 106. The engagement between the first pin 216 and the second pin 218 within the first channel 212 and the second channel 214, respectively, may prevent the connector 108 from reorienting (e.g., twisting, rotating, etc.) during tightening of the fastener 200. For example, as the fastener 200 is tightened to secure the solar panel module 102 (e.g., clockwise about the Y-axis) a rotational force may be imparted to the connector 108. However, the positioning of the first pin 216 and the second pin 218 within the first channel 212 and the second channel 214, respectively, may maintain an alignment of the connector 108 relative to the mount 106.

Figures 5D, 5E:
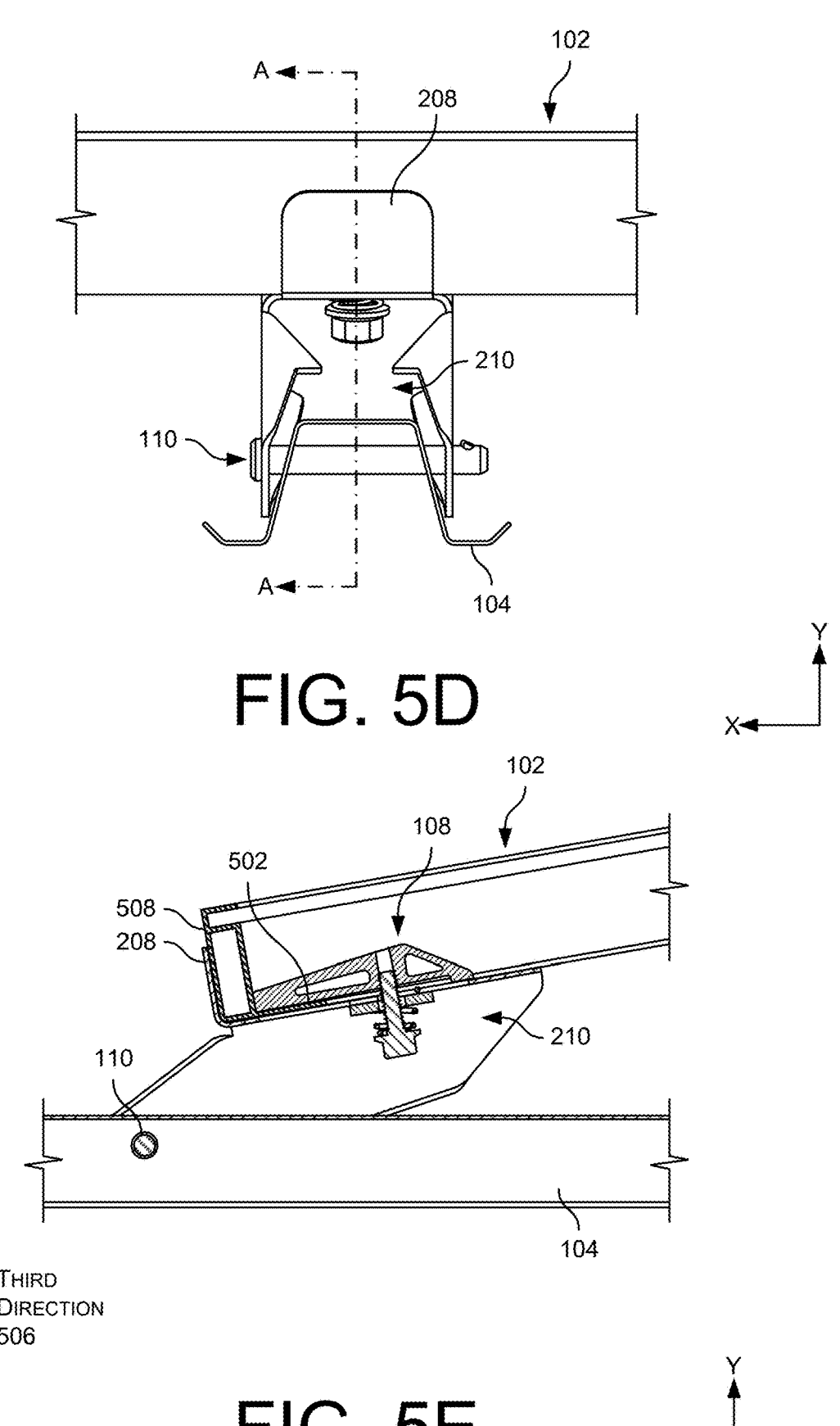
FIG. 5D illustrates an example use of the clamp of FIG. 1 for attaching the solar panel module to the rail, according to embodiments of the present disclosure.
FIG. 5E illustrates a partial cross-sectional view of the clamp of FIG. 1 taken along line A-A of FIG. 5D, showing an example use of the clamp for attaching the solar panel module to the rail, according to embodiments of the present disclosure.

In FIGS. 5D and 5E, once the clamp 100 secures the solar panel module 102, the solar panel module 102 may be rotated in a third direction 506 (e.g., about the X-axis), about the fastening mechanism 110, to lay the solar panel module 102 down and move the clamp 100 to the downward position. As shown in FIG. 5E, which represents a partial cross-sectional view taken along line A-A of FIG. 5D, the flange 502 of the solar panel module 102 may be secured between the connector 108 and the mount 106. In addition, an end 508 of the solar panel module 102 may be secured against (e.g., abut) the lip 208.

Once moved to the downward position, as shown in FIGS. 5D and 5E, the rail 104 may at least partially reside within the receptacle 210. A disposition of the rail 104 within the receptacle 210 may arrest rotation of the solar panel module 102 (e.g., about the Y-axis). Additionally, other mounts, brackets, connectors, etc. may be used to secure an opposite end, side, etc. of the solar panel module 102 from where the clamp 100 is secured to the solar panel module 102. These other mounts, brackets, etc. may also arrest rotation of the solar panel module 102 (e.g., about the X-axis). For example, given that the clamp 100 may represent a "south mount," other mounts may be secured to the north side of the solar panel module 102. During such, the clamp 100 may rotate about the fastening mechanism 110.

Figure 6:
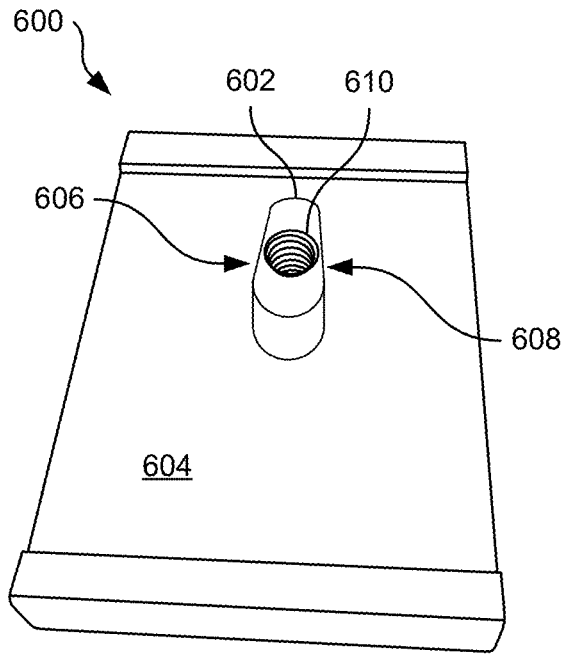
FIG. 6 illustrates an alternative connector that may be used to attach the solar panel module to a rail, according to embodiments of the present disclosure.
Figure 6:
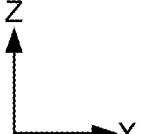

FIG. 6 illustrates a connector 600 that may be used to secure the solar panel module 102 to the rail 104, according to embodiments of the present disclosure. In an embodiment, the connector 600 may be similar to the connector 108. However, as shown, the connector 600 may omit the first pin 216 and the second pin 218. Instead, the connector 600 may include a post 602 that extends from a surface 604 (e.g., bottom surface). The post 602 may be configured to be disposed within the slot 220 of the mount 106, for example, or another mount having a slot.

The post 602 may include a first side 606 and a second side 608, opposite the first side 606 (e.g., in the X-direction). The first side 606 and the second side 608 may be planar. Given the planar nature of the first side 606 and the second side 608, the connector 600 may resist rotation during tightening of the fastener 200. A passage 610 is included in the post 602 for receiving the fastener. In such instances, the first channel 212 and the second channel 214 of the mount 106 may be omitted from the mount 106.

The post 602 may be milled from the connector 600, may be welded onto the connector 600, press-fit onto the connector 600 (e.g., within a hole of the connector 600), etc. Functionally, the operation of the connector 600, or a clamp employing the connector 600, may be similar to the clamp 100 as discussed herein. Although the post 602 is shown and described as extending from, or integrated with, the connector 108, in an embodiment, the post 602 may be a separate component.

Figure 7:
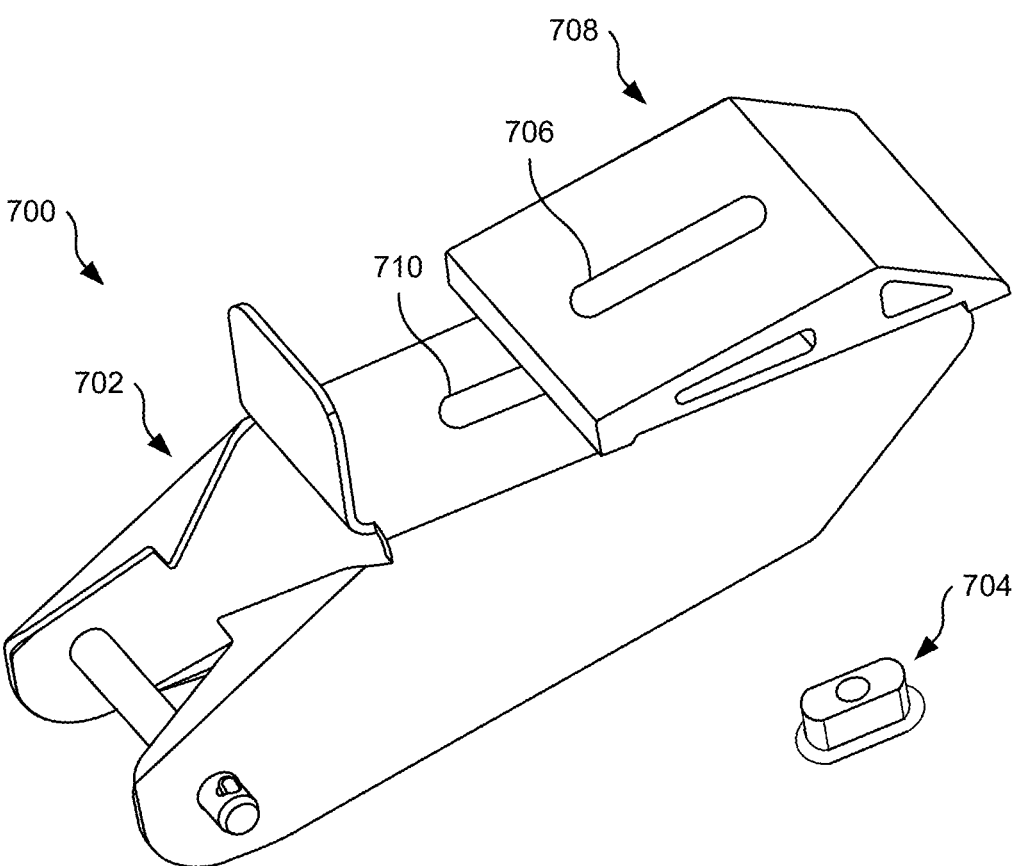
FIG. 7 illustrates an alternative clamp that may be used to attach the solar panel module to a rail, according to embodiments of the present disclosure.
Figure 7:
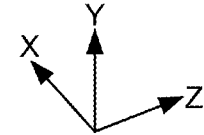

FIG. 7 illustrates a clamp 700 that may be used to secure the solar panel module 102 to the rail 104, according to embodiments of the present disclosure. The clamp 700 may include a mount 702, which may be similar to the mount 106 as discussed above. However, in an embodiment, the first channel 212 and the second channel 214 may be omitted, and instead, the mount 702 may include a slot 710. A bushing 704 may be configured to reside within the slot 710, as well as a slot 706 disposed through a connector 708 of the clamp 700.

In an embodiment, sides of the bushing 704 may be planar. Given the planar nature of the sides, the connector 708 may resist rotation during the tightening of a fastener. For example, the bushing 704 may be disposed in the slot 710 and at least partially in the slot 706. In an embodiment, a fastener (not shown) may be disposed through the bushing 704, and may be threaded into a nut, for example, disposed adjacent to the connector 708.

Figure 8:
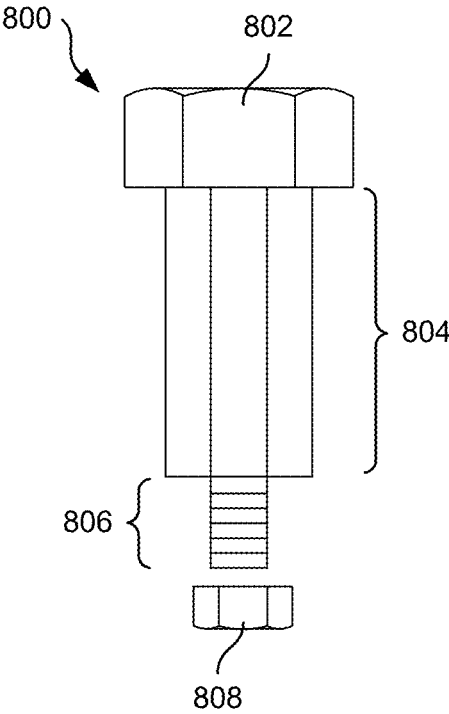
FIG. 8 illustrates an alternative fastener that may be used to attach the solar panel module to a mount, according to embodiments of the present disclosure.
Figure 8:
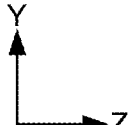

FIG. 8 illustrates an example fastener 800 that may be used to secure the solar panel module 102 to the rail 104, according to embodiments of the present disclosure. In an embodiment, the fastener 800 may be used with the clamp 700. For example, instead of using the bushing 704, the fastener 800 may be disposed through the slot 706 in the connector 708 and the slot 710 in the mount 702. The fastener 800 may include a head 802 disposed adjacent to the slot 706. A first portion 804 of the fastener 800 may include planar sides for engaging with the slot 710 and the slot 706 to resist rotation of the connector 708, for example, during tightening of the fastener 800. A second portion 806 of the fastener 800 may be threaded to receive a nut 808, for example, to secure the connector 708 to the mount 702.

FIG. 9 illustrates an example mount 900 that may be used to secure the solar panel module 102 to the rail 104, according to embodiments of the present disclosure. In an embodiment, the mount 900 may include a base 902 having a protrusion 904 (e.g., post, collar, column, etc.). The protrusion 904 may be configured to be disposed within a slot, channel, etc. of a connector, such as the connector 708. The connector may slide between ends of the protrusion 904 to move between the first position and the second position, as well as to prevent the connector from rotating during the tightening of the fastener. For example, the fastener may be disposed through a passage 906 in the protrusion and may be threaded into a nut disposed adjacent to the connector.

Figure 10:
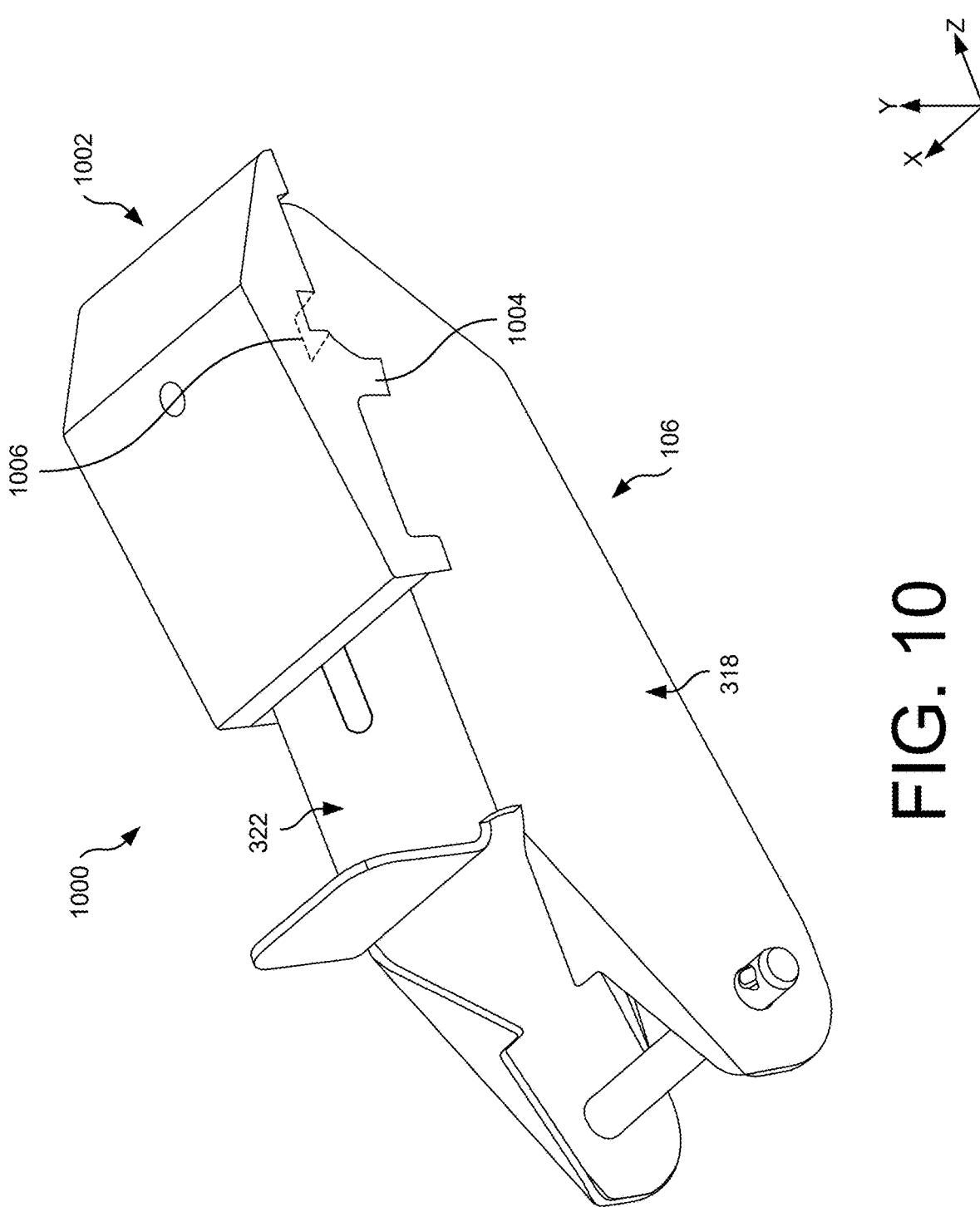
FIG. 10 illustrates an alternative clamp for attaching a solar panel module to a rail, according to embodiments of the present disclosure.

FIG. 10 illustrates an example clamp 1000 that may be used to attach the solar panel module 102 to the rail 104, according to an embodiment of the present disclosure. In an embodiment, the clamp 1000 may be similar to the clamp 100. For example, the clamp 1000 may include the mount 106. However, the clamp 1000 may include a connector 1002 as compared to the connector 108. In an embodiment, the connector 1002 may be formed via stamping. For example, the connector 1002 may be formed via stamping a piece of sheet metal.

The connector 1002 may include one or more first tabs 1004 that are disposed along the first side 318 of the mount 106. The first tabs 1004 may engage with the first side 318 of the mount 106 to prevent or arrest rotation of the connector 1002 as the fastener is tightened to secure the solar panel module 102 to the clamp 1000 (e.g., the fastener 200 attached to the connector 1002). The connector 1002 may include additional tabs on an opposing side of the connector 1002 for engaged with the second side 320 of the mount 106. The connector 1002 may also include one or more second tabs 1006 that are disposed along and/or engage along the top 322 of the mount 106. For example, as the connector 1002 moves between the first position and the second position, the second tabs 1006 may slide along the top 322 of the mount 106. The mount 106 may include any number of the one or more first tabs 1004 and any number of the one or more second tabs 1006.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A clamp for a solar panel module, the clamp comprising:

a mount including:
    a base defining a slot and a channel,
    a first flange extending from the base,
    a second flange extending from the base, and
    a third flange extending from the base;

a connector that transitions between a first position in which the solar panel module is insertable onto the mount, and a second position in which the solar panel module is clamped to the mount, the connector including:
    a first end,
    a second end opposite the first end, wherein:
        in the first position of the connector, the second end is spaced apart from the third flange by a first distance, and
        in the second position of the connector, the second end is spaced apart from the third flange by a second distance that is less than the first distance, and a pin located between the first end and the second end, the pin disposed at least partially through the channel; and a fastener disposed at least partially through the slot to attach the connector to the mount.

2. The clamp of claim 1, wherein in the second position of the connector, tightening the fastener clamps the solar panel module to the mount.

3. The clamp of claim 1, wherein:

the pin is movable within the channel between the first position and the second position; and the fastener is movable within the slot between the first position and the second position.

4. The clamp of claim 1, wherein:

the base includes a second channel; and the connector includes a second pin disposed at least partially within the second channel.

5. The clamp of claim 4, wherein the channel, the second channel, and the slot are parallel to one another.

6. The clamp of claim 4, wherein the slot is located between the channel and the second channel.

7. The clamp of claim 1, wherein the pin is disposed at least partially through the channel to prevent the connector from rotating during tightening of the fastener.

8. The clamp of claim 1, wherein:

the mount includes an end; and the connector includes a shelf that engages with the end in the first position to prevent the connector transitioning from the first position to the second position.

9. The clamp of claim 1, further comprising a biasing element that applies a biasing force to urge the connector in a direction towards the base.

* * * * *